(12) United States Patent
Chan

(10) Patent No.: US 9,482,878 B2
(45) Date of Patent: Nov. 1, 2016

(54) ELASTIC HINGE FOR SPECTACLES
(71) Applicant: KINGLORY (Hong Kong) Limited, Hong Kong (CN)
(72) Inventor: Chi Chiu Chan, Hong Kong (CN)
(73) Assignee: KINGLORY (HONG KONG) LIMITED, Hong Kong (CN)
( * ) Notice: Subject to any disclaimer, the term of this patent is extended or adjusted under 35 U.S.C. 154(b) by 0 days.
(21) Appl. No.: 15/006,325
(22) Filed: Jan. 26, 2016
(65) Prior Publication Data
US 2016/0223834 A1 Aug. 4, 2016
(30) Foreign Application Priority Data
Feb. 4, 2015 (CN) ...................... 2015 2 0081146 U
(51) Int. Cl.
*G02C 5/22* (2006.01)
(52) U.S. Cl.
CPC ......... *G02C 5/2254* (2013.01); *G02C 2200/06* (2013.01); *G02C 2200/12* (2013.01); *G02C 2200/22* (2013.01); *Y10T 16/525* (2015.01)
(58) Field of Classification Search
CPC ............... Y10T 16/526; Y10T 16/525; Y10T 16/5253; E05D 1/00; E05D 3/02; G02C 5/2209; G02C 5/2254; G02C 5/2272; G02C 5/2218; G02C 2200/06; G02C 2200/12; G02C 2200/22
USPC ............................ 16/228, 225, 226; 351/153
See application file for complete search history.

(56) References Cited

U.S. PATENT DOCUMENTS

| | | | | |
|---|---|---|---|---|
| 3,744,887 A * | 7/1973 | Dunbar | ............... | G02C 5/2209 16/225 |
| 6,942,338 B2 * | 9/2005 | Ku | ......................... | G02C 5/146 16/228 |
| 7,073,904 B2 * | 7/2006 | Chene | .................. | G02C 5/2218 16/228 |
| 7,441,890 B2 * | 10/2008 | Chung | ..................... | G02C 5/22 16/228 |
| 8,042,939 B2 * | 10/2011 | Le Duy | .................. | G02C 5/008 16/228 |
| 8,308,289 B2 * | 11/2012 | Niu | ....................... | G02C 5/2254 16/228 |
| 8,944,591 B2 * | 2/2015 | Li | .......................... | G02C 3/003 16/228 |
| 8,978,204 B2 * | 3/2015 | Hotellier | ................ | G02C 5/008 16/228 |
| 9,069,190 B2 * | 6/2015 | Carpenter | ............. | G02C 5/008 |
| 9,207,465 B1 * | 12/2015 | Huang | ...................... | G02C 5/10 |
| 2013/0239366 A1 * | 9/2013 | Kim | ........................ | G02C 1/08 16/228 |
| 2014/0132912 A1 * | 5/2014 | Chou | .................... | G02C 5/2209 351/121 |
| 2014/0247421 A1 * | 9/2014 | Chang | .................. | G02C 5/2254 351/116 |

FOREIGN PATENT DOCUMENTS

CN          203385945 U  *  1/2014

* cited by examiner

*Primary Examiner* — William Miller
(74) *Attorney, Agent, or Firm* — Muncy, Geissler, Olds & Lowe, P.C.

(57) ABSTRACT

An elastic hinge for spectacles includes a first hinge component having two chip elements connected together by means of being partially overlapped, and a second hinge component having two chip elements superimposed together. One chip element in the first hinge component is connected with the chip element of the second hinge component. A gap is disposed at the joint of one chip element of the first hinge component and one chip element of the second hinge component. Movable space is formed between the first hinge component and the second hinge component, so that the hinge elastically moves inwards or outwards. The elastic hinge is installed after the trim and the arm of the spectacles. Relying on the mutually smart cooperation of the components, the arm of the spectacles can have functions of bounding inwards and outwards without the help of any slingshot element, and has good durability.

10 Claims, 8 Drawing Sheets

ELASTIC HINGE FOR SPECTACLES

TECHNICAL FIELD

The utility model relates to an article for spectacles, and more particularly, the utility model specially relates to a thin-type hinge for spectacles capable of bounding inwards and outwards.

BACKGROUND

An indispensable daily product for correcting vision of those having vision disorders, more eyewear factories and companies pay attention to spectacles, and also research and develop various spectacles of different structures, so as to satisfy different demands. For common spectacles, a hinge thereof is a required composition structure. Nowadays, a double-function spring hinge is usually used on the spectacles, which has a function of bounding outwards, so that a wearer feels very comfortable. Moreover, it also has a function of bounding inwards, so that it is also very convenient to fold the spectacles. However, the hinge having the spring structure has limitations thereof. Excluding easy wearout, a hinge screw for connection may also get loose possibly during incessant opening and closing rotation. There are also some elastic (non-spring) hinges, which try to improve the design so as to increase the durability of the spectacles temple. Its common structure limits changes on the appearance design of a spectacle frame, and also lacks the function of bounding outwards. Those elastic (non-spring) hinges cannot completely substitute the advantages of the conventional spring hinge.

Therefore, it is necessary to design a novel elastic hinge for spectacles, which substitutes the conventional spring hinge for spectacles, but also has the functions of bounding inwards and outwards, and can also increase the durability of the spectacles.

SUMMARY

A technical problem to be solved by the utility model is to provide a novel elastic hinge for spectacles, which can realize self function of bounding inwards and outwards without any element, and is durable.

To realize the foregoing purpose, the utility model employs a technical solution as follows:

An elastic hinge for spectacles includes:

a first hinge component which includes two chip elements and the two chip elements are connected together by means of being partially overlapped;

a second hinge component which includes two chip elements and the two chip elements are superimposed together, wherein one chip element in the first hinge component is connected with the chip element of the second hinge component; and a gap disposed at the joint of one chip element of the first hinge component and one chip element of the second hinge component, and movable space is formed between the first hinge component and the second hinge component, so that the elastic hinge for spectacles moves elastically.

In the elastic hinge for spectacles according to the utility model, the first hinge component includes:

a first chip element which has an arc surface; and a second chip element which is of a rectangular shape, and is integrally connected with the first chip element, wherein one end of the second chip element has an oblique edge.

In the elastic hinge for spectacles according to the utility model, the second chip element is provided with a through hole.

In the elastic hinge for spectacles according to the utility model, the second hinge component includes:

a third chip element, wherein one end of the third chip element is configured into a hook shape; and a fourth chip element, wherein one end of the fourth chip element is provided with a step portion lower than the surface of the fourth chip element, and the third chip element is jointed on the surface of the fourth chip element, and the hook shape end leans against the step portion of the fourth chip element.

In the elastic hinge for spectacles according to the utility model, the second hinge component further includes a connector, so as to fix the third chip element and the fourth chip element together.

In the elastic hinge for spectacles according to the utility model, the two ends of the connector are provided with a step portion, and one end of the connector is provided with an opening In the elastic hinge for spectacles according to the utility model, the third chip element and the fourth chip element are provided with corresponding through holes, and the step portions of the connector are clamped in the through holes.

In the elastic hinge for spectacles according to the utility model, the third chip element is provided with a round hole. Preferably, the round hole is a screw hole.

In the elastic hinge for spectacles according to the utility model, the third chip element and the fourth chip element are welded together or connected together by rivets.

In the elastic hinge for spectacles according to the utility model, one end of the third chip element is configured into two hook shapes.

The elastic hinge of the utility model is installed after the trim and the spectacles temple. Relying on the mutually smart cooperation of the components of the elastic hinge, the spectacles temple can also have functions of bounding inwards and outwards without the help of any spring element.

The elastic hinge of the utility model is easy to assemble, can be replaced by the user, and has good durability.

BRIEF DESCRIPTION OF THE DRAWINGS

To explain the utility model more clearly, the utility model will be described in details hereinafter with reference to the drawings, wherein.

DETAILED DESCRIPTION

Figure 1:
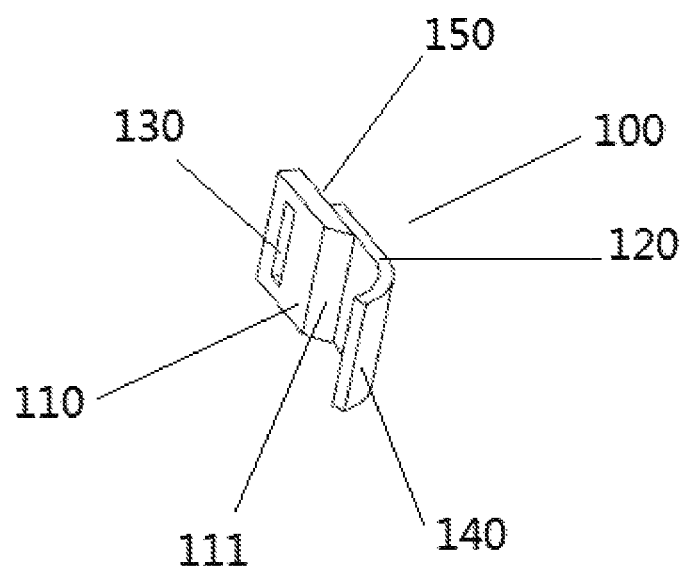
FIG. 1 shows a schematic view of a first hinge component of an elastic hinge for spectacles according to the utility model.
Figure 2:
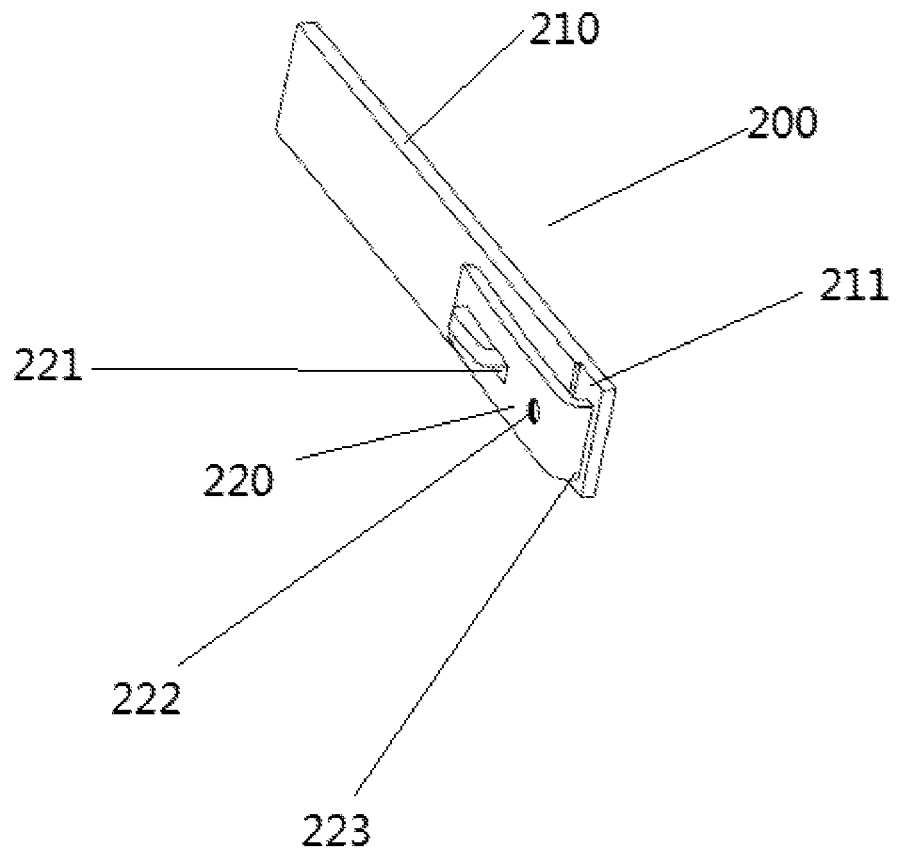
FIG. 2 shows a schematic view of a second hinge component of the elastic hinge for spectacles according to the utility model.
Figure 3:
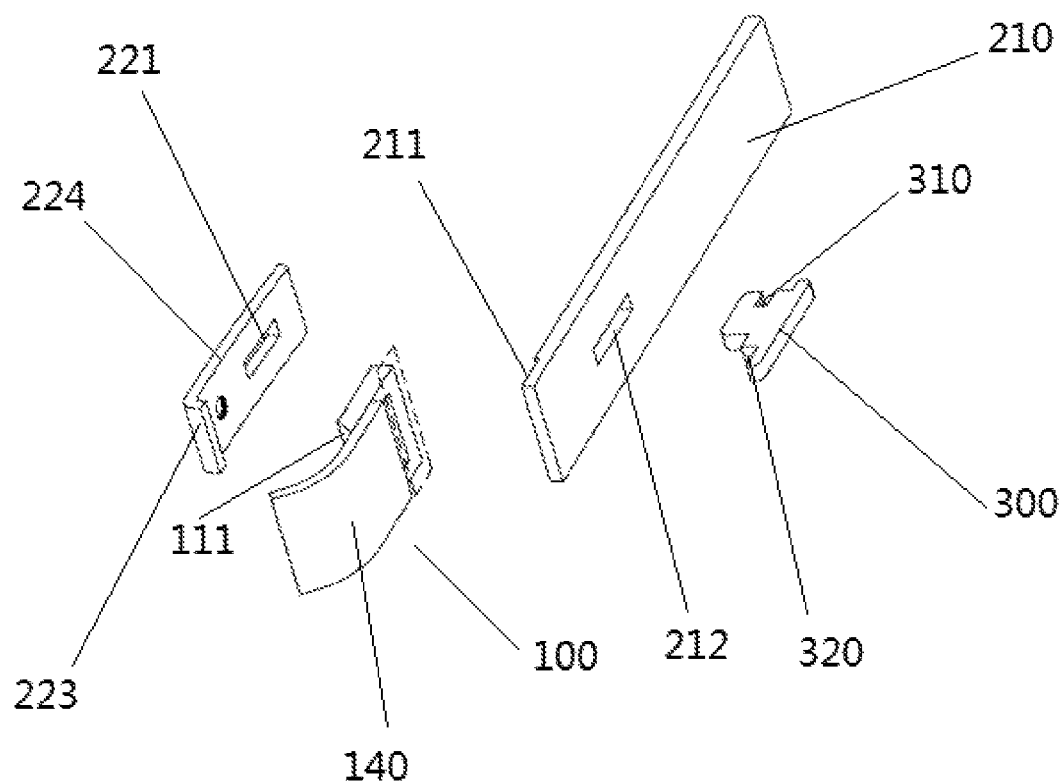
FIG. 3 shows an exploded schematic view of the elastic hinge for spectacles according to the utility model.
Figure 4:
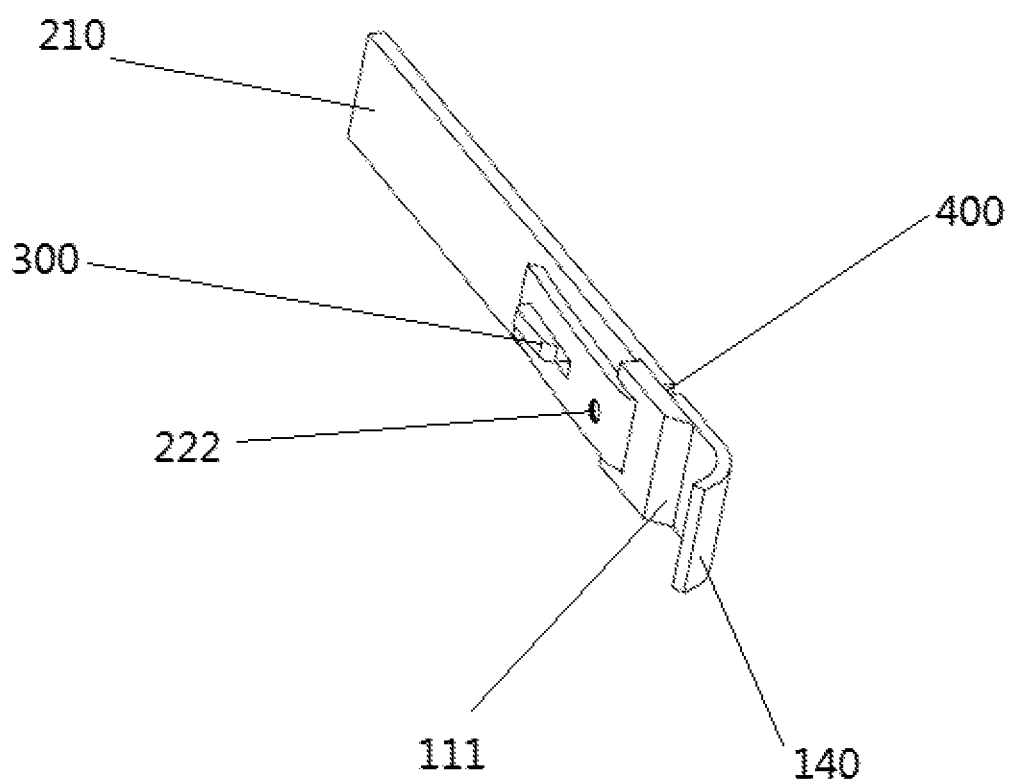
FIG. 4 shows a schematic view of the elastic hinge for spectacles after assembly according to the utility model.

Preferred embodiments of the utility model will be given hereinafter with reference to the drawings so as to explain the technical solution of the utility model in details.

As shown in FIG. 1 to FIG. 4, the elastic hinge for spectacles of the utility model includes a first hinge component 100 configured to connect the trim of a spectacle frame, and a second hinge component 200 configured to connect the spectacles temple. Certainly, in one embodiment, a mutual-exchanged connection manner may also be conducted, i.e., the first hinge component 100 is connected with the spectacles temple while the second hinge component 200 is configured to connect the trim of the spectacle frame. The first hinge component 100 may include a first chip element 110 and a second chip element 120, and the two chip elements 110 and 120 are connected together by means of being partially overlapped, for example, combined together by means of welding. The second hinge component 200 may include a third chip element 210 and a fourth chip element 220, and the two chip elements 210 and 220 are superimposed together. One chip element of the first hinge component is connected with the chip element of the second hinge component. A gap 400 is formed at the joint of one chip element of the first hinge component 100 and one chip element of the second hinge component 200, and movable space is formed by a gap 400 between the first hinge component and the second hinge component so that the elastic hinge for spectacles can move elastically.

The first hinge component 100 can be made of metal, for example, stainless steel materials, and the two chip elements 110 and 120 of the first hinge component are welded together. The chip element 110 is also provided with a through hole 130. Preferably, the through hole 130 is shaped as a rectangle, one end surface of the chip element 110 is oblique to form an oblique edge 111, while the other chip element 120 is of an arc structure 140.

The second hinge component 200 can be also made of metal, for example, stainless steel material, and the chip elements 210 and 220 of the second hinge component are connected together. In one embodiment, the chip elements 210 and 220 are assembled together by a connector 300. One end of the chip element 210 is configured as a step shape 211, the portion 211 is lower than the surface of the entire chip element 210, and the chip element 210 is provided with a through hole 212. Preferably, the through hole can be shaped as a rectangular. The chip element 220 includes through holes 221 and 222. Preferably, the through hole 221 is rectangular, and the through hole 222 is a round hole. Preferably, the round hole is a screw hole. In one embodiment, one side of the chip element 220 is an arc face, and the end portion thereof is configured as a hook shape 223. The two ends of the connector 300 are provided with a step portion 320, and one end of the connector is provided with an opening 310.

When assembling the elastic hinge for spectacles, the connector 300 is penetrated through the through holes of the chip elements 210 and 220 firstly, wherein the opening 310 is configured to be opposite to the step shape 211, and the top of the connector 300 is flatly close to the surface of the chip element 210. One hook shape end of the other chip element 220 is configured correspondingly to the step shape, then the entire chip element 220 is pushed in the step portion 320 of the connector 300, thus finishing buckling and assembling. Then a threaded rod is rotated aligning with the round hole 222, the hook shape position is pulled up to a certain distance, the step portion 211 of the chip element 220 is pulled apart from the hook shape 223 at the front end of the chip element 200 by a certain distance, then the step portion 211 is jointed with the rest portions of the chip element 110 and the second chip element 120 of the first hinge component after being jointed, then one hook shape end of the chip element 220 is dropped through a threaded rod and then tightly buckled in the through hole 130 of the chip element 110, so as to finish the assembly of the entire elastic hinge. After the assembly is finished, a gap 400 can be formed between the first hinge component and the second hinge component, so as to be beneficial for the spectacles temple to swing, and the swinging angle can be limited, so as to protect the spectacles temple from being damaged by swinging excessively.

Figure 5:
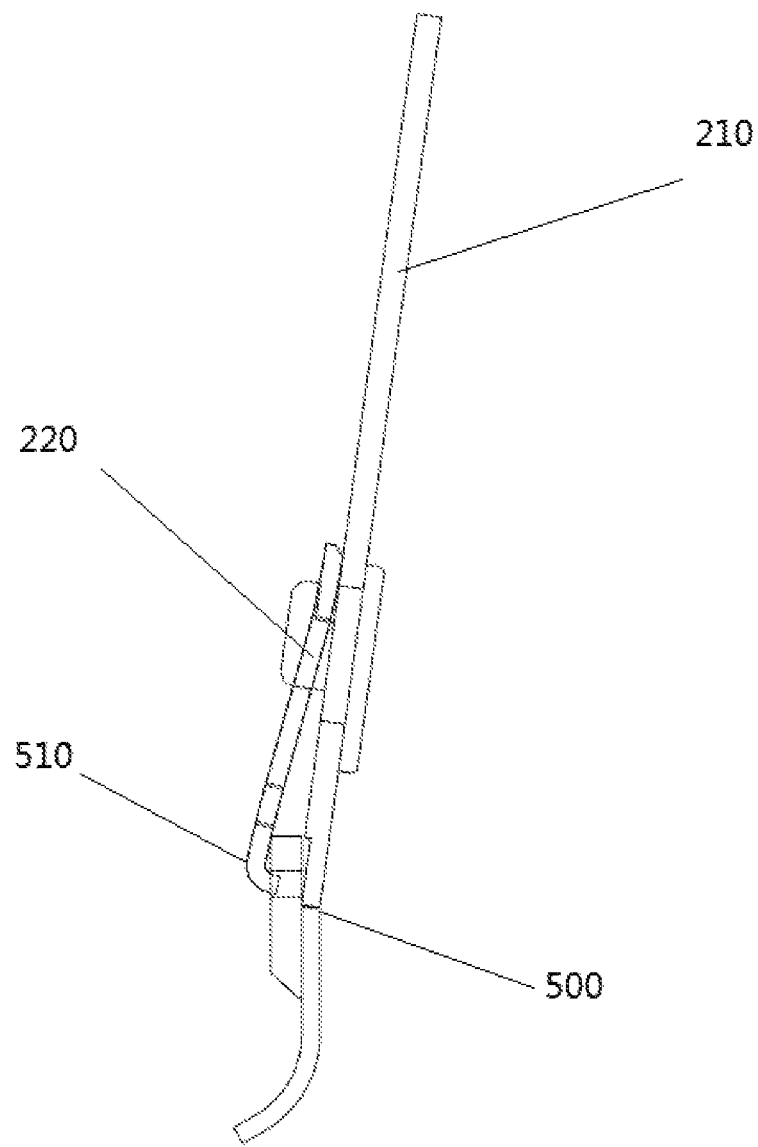
FIG. 5 shows a schematic view of the elastic hinge for spectacles folding-over outwards according to the utility model.
Figure 6:
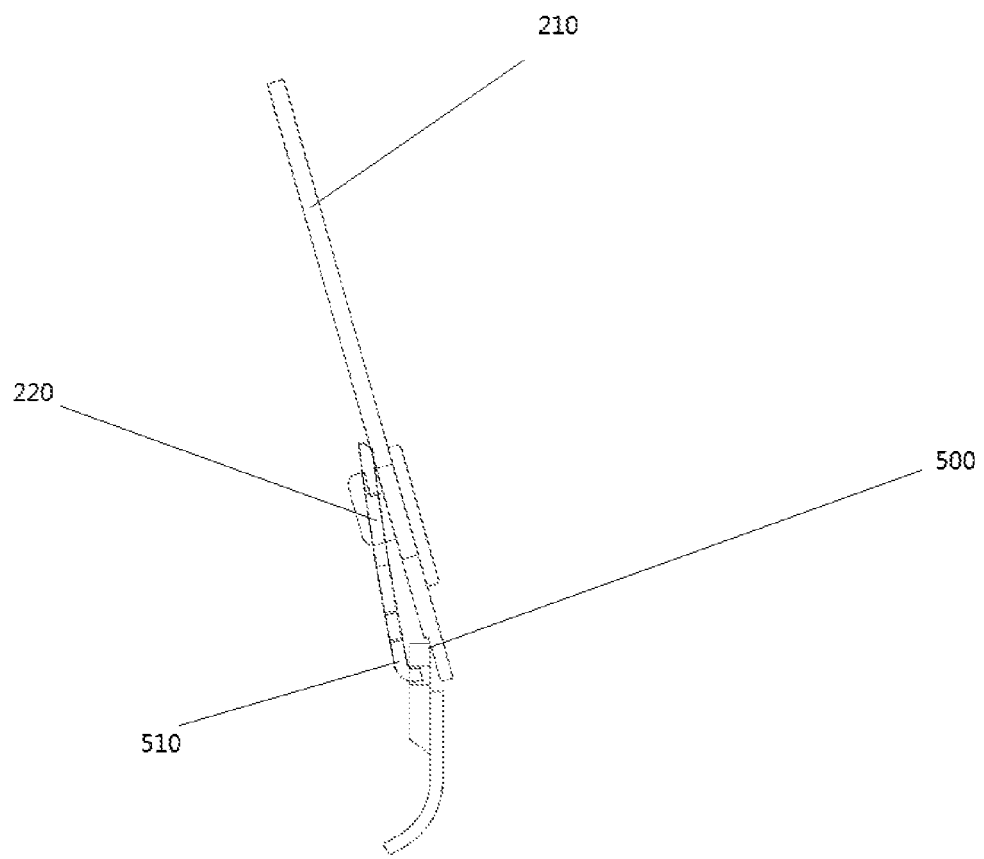
FIG. 6 shows a schematic view of the elastic hinge for spectacles folding-over inwards according to the utility model.

As shown in FIG. 5 and FIG. 6, the elastic hinge for spectacles of the utility model can be bounded inwards or outwards. When bounding outwards, the chip element 210 can receive an outward (rightward in the figure) force, so that the second hinge component can move towards the outside of the spectacles to form a pivot 500 between the end portion of the chip element 210 and the end portion of the chip element 220, and the chip element 220 is formed with a force resistance point 510, so that the entire spectacles temple can move outwards by a certain distance, thus generating an effect of bounding outwards. When bounding outwards, the gap 400 will make the hinge stop moving after rotating to a certain position, which avoids the entire elastic hinge from damage due to excessive movement of the hinge components.

When bounding inwards, the chip element 210 can receive an inward (moving leftward in the figure) force, so that the second hinge component can move towards the inside to form a pivot 500 between one end portion of the chip element 110 of the first hinge component and the position 211, and the chip element 220 is formed with a force resistance point 510. When the second hinge component rotates inwards to a certain angle, one end portion of the chip element 110 will push against the position 211. At this moment, the hook shape 223 portion of the chip element 210 will completely penetrate through the hole position of the chip element 110, so that a tensile force disappears, then the second hinge component will stop swinging immediately, so that the spectacles temple is folded.

In one embodiment, the connector 300 is not used in the second hinge component 200, while the two chip elements 210 and 220 are connected together by means of welding.

Figure 7:
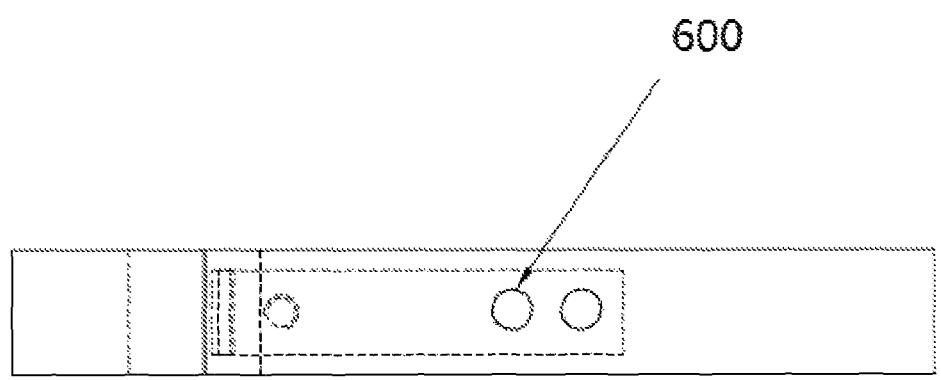
FIG. 7 shows a schematic view of rivets used in the elastic hinge for spectacles of the utility model.
Figure 8:
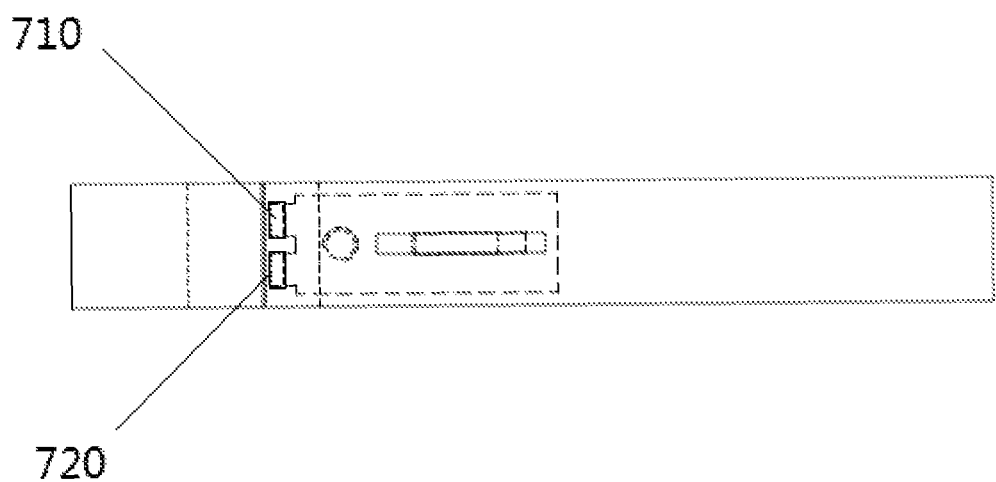
FIG. 8 shows a schematic view of two hook shape portions arranged in the chip elements of the elastic hinge for spectacles of the utility model.

In another embodiment, as shown in FIG. 7, the connector 300 is not used in the second hinge component 200, while the two chip elements 210 and 220 are connected together by rivets 600.

In an alternative embodiment, one end of the chip element 220 is not configured as a hook shape, but is designed as double hook shapes 710 and 720, then the chip element 110 of the first hinge component is configured as a double-hole shape for mutual combination. Such structure may further improve the connecting relationship between elements.

According to the elastic hinge for spectacles of the utility model, the functions of bounding inwards and outwards of the entire hinge can be implemented by utilizing the special structural design only without the help of any elastic or spring part, thus greatly improving the problems in prior arts.

The structure of the hinge in the utility model can be easily dismounted, which can be convenient for production or replacement and repairing.

The object, solved technical solution and advantageous effects of the utility model are further described in details in the above embodiment. It should be understood that the foregoing is merely preferred embodiments of the utility model, but is not intended to limit the utility model, and any modification, equivalent replacement, improvement and the like made within the spirits and principles of the utility model shall all fall within the protection scope of the utility model.

The invention claimed is:

1. An elastic hinge for spectacles, comprising:
a first hinge component which comprises first and second chip elements and the first and second chip elements are connected together by being partially overlapped;
a second hinge component which comprises third and fourth chip elements and the third and fourth chip elements are superimposed together,
wherein one chip element in the first hinge component is connected with one the chip element of the second hinge component; and
a gap disposed between another chip element of the first hinge component and said one chip element of the second hinge component, so as to form a movable space between the first hinge component and the second hinge component, so that the elastic hinge for spectacles moves elastically.

2. The elastic hinge for spectacles according to claim 1, wherein:
said first chip element has an arc surface; and
said second chip element is of a rectangular shape, and is integrally connected with the first chip element, and wherein one end of the second chip element has an oblique edge.

3. The elastic hinge for spectacles according to claim 2, wherein the second chip element is provided with a through hole.

4. The elastic hinge for spectacles according to claim 1, wherein
one end of the third chip element is configured as a hook shape; and
one end of the fourth chip element is provided with a step portion lower than a longitudinal surface of the fourth chip element, and the third chip element is jointed on the surface of the fourth chip element, and the hook shape end leans against the step portion of the fourth chip element.

5. The elastic hinge for spectacles according to claim 4, wherein the second hinge component further comprises a connector so as to fix the third chip element and the fourth chip element together.

6. The elastic hinge for spectacles according to claim 5, wherein two ends of the connector are provided with a step portion, and one end of the connector is provided with an opening.

7. The elastic hinge for spectacles according to claim 6, wherein the third chip element and the fourth chip element are provided with corresponding through holes, and the step portions of the connector are clamped in the through holes.

8. The elastic hinge for spectacles according to claim 4, wherein the third chip element is provided with a round hole.

9. The elastic hinge for spectacles according to claim 4, wherein the third chip element and the fourth chip element are welded together or connected together by rivets.

10. The elastic hinge for spectacles according to claim 4, wherein said one end of the third chip element is configured into two hook shapes.

* * * * *